United States Patent [19]

Terasaka

[11] Patent Number: 5,268,768
[45] Date of Patent: Dec. 7, 1993

[54] TRANSMITTING METHOD AND TRANSMITTING APPARATUS OF STORED INFORMATION OF MEMORY

[75] Inventor: Teiji Terasaka, Yamatokoriyama, Japan

[73] Assignee: Sharp Kabushiki Kaisha, Osaka, Japan

[21] Appl. No.: 980,432

[22] Filed: Nov. 23, 1992

Related U.S. Application Data

[63] Continuation of Ser. No. 431,890, Nov. 6, 1989, abandoned.

[30] Foreign Application Priority Data

Nov. 7, 1988 [JP] Japan .................................. 63-281791

[51] Int. Cl.[5] .................................................. G06F 12/02
[52] U.S. Cl. ..................................... 358/404; 358/440; 395/425
[58] Field of Search ................ 364/200 MS, 900 MS; 395/400, 425; 358/401, 403, 404, 405, 261.4, 440, 467, 468, 444

[56] References Cited

U.S. PATENT DOCUMENTS

| | | | |
|---|---|---|---|
| 3,848,084 | 11/1974 | Rodda et al. | 178/6.8 |
| 3,895,357 | 7/1975 | Schwartz et al. | 340/172.5 |
| 4,451,824 | 5/1984 | Thayer et al. | 340/720 |
| 4,524,393 | 6/1985 | Ohzeki | 358/257 |
| 4,570,185 | 2/1986 | Arai et al. | 358/227 |
| 4,829,559 | 5/1989 | Izawa et al. | 358/468 |
| 4,896,261 | 1/1990 | Nolan et al. | 395/325 |

FOREIGN PATENT DOCUMENTS

| | | |
|---|---|---|
| 2589657 | 9/1986 | France . |
| 2166619 | 9/1985 | United Kingdom . |

*Primary Examiner*—Joseph L. Dixon
*Assistant Examiner*—Hiep T. Nguyen

[57] ABSTRACT

In an apparatus for transmitting stored information from memory, the store area of memory is divided according to a predetermined store capacity. The data is transmitted from the divided store area. A transmission for the store areas is also stored. When transmitting, the stored information is sent out according to this transmission sequence, and the transmitted data is erased from the memory. Afterwards, the apparatus searches the store areas in which stored data is to be transmitted to continue the transmission. Thus, if the quantities of data to be transmitted should vary, it is not necessary to shift the store areas within the memory to erase the transmitted data, and hence the transmission time is shortened.

9 Claims, 5 Drawing Sheets

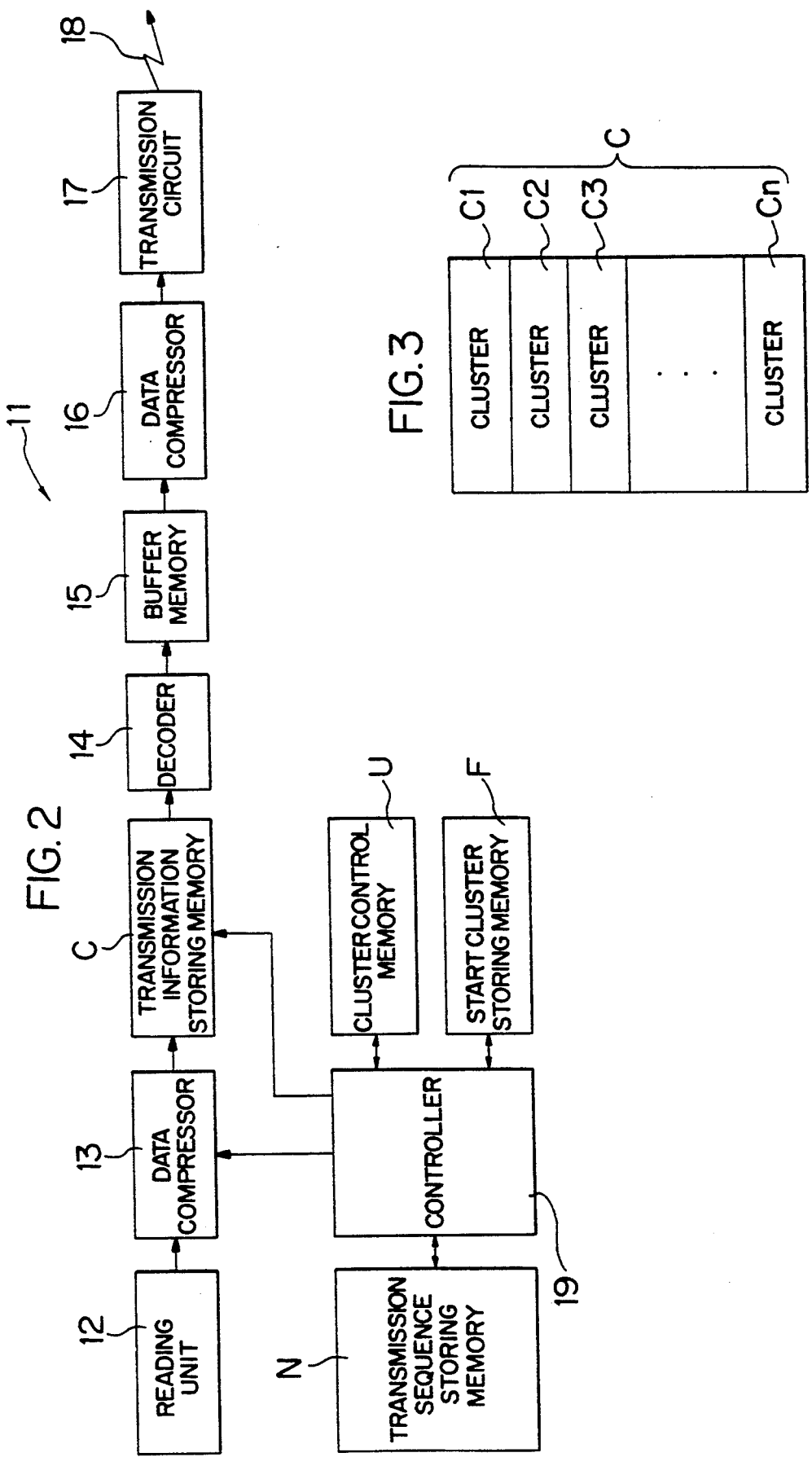

TRANSMITTING METHOD AND TRANSMITTING APPARATUS OF STORED INFORMATION OF MEMORY

This application is a continuation of application Ser. No.: 07/431,890 filed on Nov. 6, 1989, now abandoned.

BACKGROUND OF THE INVENTION

1. Field of the Invention

The present invention relates to a method and apparatus for transmitting information stored in a memory, preferably executed in a facsimile apparatus or the like, for storing the image data obtained by reading original images of plural documents into a memory and then transmitting.

2. Description of the Prior Art

Hitherto, in the facsimile apparatus or the like, the apparatus having functions for transmitting plural sets of identical or different image data that have been read by a reading unit, to plural destinations is widely known. Such facsimile apparatus is provided with a memory for storing plural sets of image data.

FIG. 1 is a diagram showing the stored information of a memory 1 in a conventional facsimile apparatus. When sending different image data to plural destinations, first plural original images of one to several pages are read by a reading unit containing a charge-coupled device (CCD). The image data delivered from the reading unit is coded by image processing such as data compression. The coded image data is stored in the memory 1.

In this memory 1, the image data is sequentially stored from the area of the smaller address number to the area of the larger number. For example, in FIG. 1(1), in store area S1, S2, image data corresponding to original images of one to several pages are stored, and when new image data is read, it is stored in a store area S3, next to the store area S2, as shown in FIG. 1(2).

In this way, the image data stored in the memory 1 is sent out sequentially to the facsimile apparatus at the destinations starting with the image data in the store area of the smaller address number.

The image data transmitted to the destinations by this operation is erased from the memory 1. For example in FIG. 1(2), when transmission of image data in store area S1 is over, the image data stored in the store areas S2, S3, . . . are shifted as shown in FIG. 1(3), so that the image data in the store area S1 is erased. Afterwards, the image data stored in the store area S2 is transmitted.

In the prior art, by shifting the image data stored in the memory 1, the image data that has been transmitted is no longer necessary and is erased.

When a large quantity of image data is stored in the memory 1, it takes a long time for such shifting action. In the facsimile apparatus, the reception action cannot be started until the transmission to plural destinations is over. Therefore, the convenience is inferior in the conventional facsimile apparatus taking a long time for the transmission action.

SUMMARY OF THE INVENTION

It is hence a primary object of the present invention to present a method and apparatus for transmitting information stored in a memory capable of transmitting the stored information from memory in a short time by solving the above-discussed problems.

To achieve the above object, the invention presents an apparatus for transmitting information comprising:

a memory having plural store areas for storing transmission information in which the information to be transmitted is stored in each store area, a memory for storing a sequence of transmission of the store areas in the transmission information storing memory, and means for transmitting by reading the stored information in the transmission information storing memory according to the transmission sequence stored in the transmission sequence storing memory.

The invention realizes method for transmitting information stored in a memory comprising the steps of:

storing the information to be transmitted in one or more store area of the memory each having predetermined store capacity, storing a sequence of transmission of the information to be transmitted stored in each store area, and, transmitting by reading out the information to be transmitted stored in the memory according to the specified sequence of transmission.

The invention presents an apparatus for transmitting information comprising:

means for generating information to be transmitted, a first memory having plural store areas of predetermined storage capacity in response to an output from the transmission information generating means for storing the information to be transmitted, memory means for storing a sequence to be transmitted of each store area of the first memory, means in response to an output from the first memory for transmitting the information, means for controlling that the stored information in the first memory is outputted to the transmitting means by each store area according to the transmission sequence stored in the memory means.

In a preferred embodiment of the invention, the memory means comprises;

a second memory having store area for storing address designating the store area of the first memory starting the information transmitting, and a third memory having store area corresponding to the store area of the first memory for storing information indicating the store area of the first memory terminating transmission of information and for storing address designating the store area of the first memory maintaining transmission of information;

the controlling means reading an address from the second memory to supply to the transmitting means the information stored in the store area of the first memory beginning transmission of informating, and controlling the transmitting operation and termination of stored information in the first memory.

Preferably the transmitting apparatus further comprises:

fourth memory having store area corresponding to each store area of the first memory for storing information indicating that the information to be transmitted is stored in the first memory, and the controlling means in response to an output from the transmission information generating means, searching the fourth memory to store the information to be transmitted in the store area of the first memory available for store by predetermined store capacity, storing in the store area of the fourth memory corresponding to the store area of the first memory being stored information to be transmitted, information indicating store of information to be transmitted, storing in the store area of the second memory address designating the store area of the first memory to be started information transmission, and storing in the store area of the third memory, information indicating the store area of the first memory at which the information transmission is terminated and address designating the store area of the first memory keeping on information transmitting.

In another preferred embodiment of the invention, the controlling means erases the stored information of each store area of the fourth memory corresponding to the store area of the first memory storing the transmitted information after transmission.

Preferably the transmission information generating means comprises image pickup elements.

Preferably the transmitting means transmits the information through the medium of telephone line.

Preferably each store area of the third memory is corresponding to plural destinations of the information to be transmitted.

According to the present invention, in the apparatus for transmitting the information stored in the memory, the transmission information storing memory has plural store areas, and the information to be transmitted is stored in divided store areas. In the transmission sequence storing memory, the sequence of transmitting the information stored in the store area of the transmission information storing memory is stored. The transmitting means reads and transmits the transmission information in the store area from the transmission information storing memory according to the transmission sequence stored in the transmission sequence storing memory.

Therefore, the shifting action of the information to be transmitted required in the prior art is not needed, and the information may be transmitted in a short time.

Thus, according to the invention, since the information to be transmitted being stored in the store area of the transmission information storing memory is transmitted according to the transmission sequence stored in the transmission sequence storing memory, it is not necessary to transmit while sequentially shifting the store area of the transmission information storing memory of the information to be transmitted, and therefore the transmission time is notably shortened and the convenience is enhanced.

BRIEF DESCRIPTION OF THE DRAWINGS

This and other objects of the invention, as well as features and advantages thereof, will be better understood and appreciated from the following detailed description taken in conjunction with the drawings, in which:

FIG. 2 is a block diagram showing an electric composition of a facsimile apparatus 11 as one of the embodiments of the invention.

FIG. 3 is a drawing showing the structure of a transmission information storing memory C.

DETAILED DESCRIPTION OF THE PREFERRED EMBODIMENT

Figure 1:
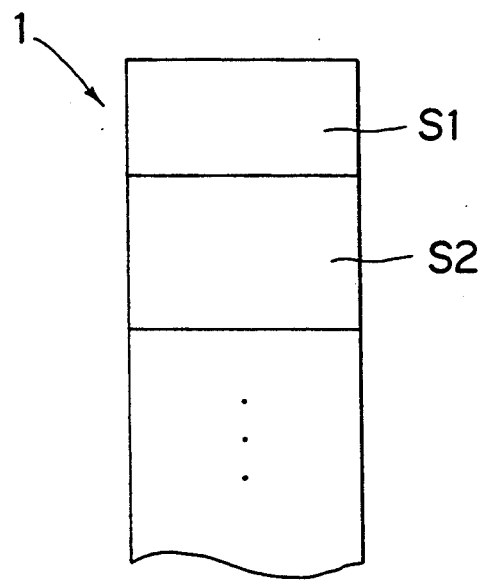
FIGS. 1(1)-1(3) are diagrams for explaining writing/reading action of a memory 1 in a conventional facsimile apparatus.
Figure 1:
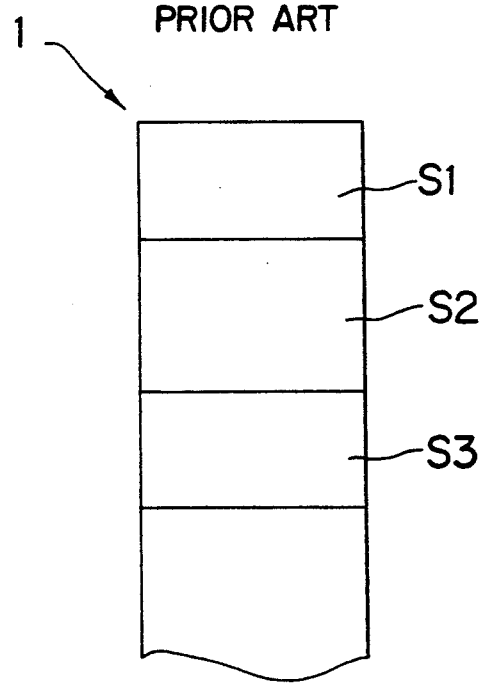
Figure 1:
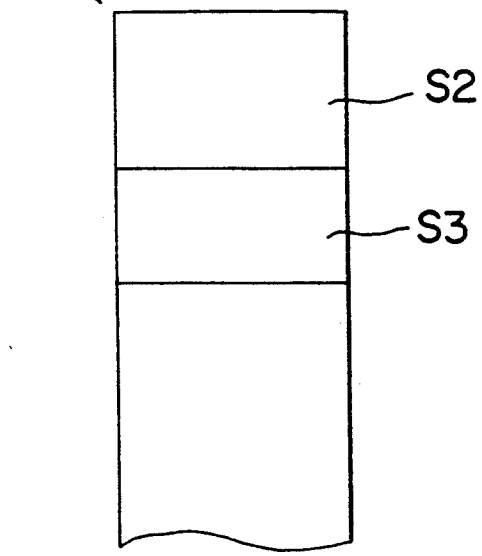

Referring now to the drawings, one of the preferred embodiments of the present invention is described in detail below.

FIG. 2 is a block diagram showing an electric composition of a facsimile apparatus 11 as one of the embodiments of the present invention. The facsimile apparatus 11 comprises a reading unit 12 for reading an original image, a transmission information storing memory C, a transmission sequence storing memory N, a controller 19 for controlling writing/reading of the transmission information storing memory C, and a transmission circuit 17 for transmitting the image data via a telephone line 18.

This facsimile apparatus 11 possesses a function of storing a plurality of image data corresponding to the original images of one or several pages, and sequentially transmitting to destinations individually corresponding to each image data.

The reading unit 12 comprises means for conveying the documents, an image pickup element realized by CCD or the like for copying the original image, and others, and it reads the original image to be transmitted, and delivers the image data into a data compressor 13. The image data having a large redundancy from the reading unit 12 is subjected to data compression processing in this data compressor 13, and the image data is encoded. The coded image data from the data compressor 13 is written into the transmission information storing memory C. The write/read control of the image data stored in the transmission information storing memory C is effected by a controller 19 which is realized, for example, by a microcomputer. Besides, in relation to the write/read action of the transmission information storing memory C, a transmission sequence storing memory N, a cluster control memory U, and a start cluster storing memory F are connected to the controller 19.

The image data being read out from the transmission information storing memory C is decoded by a decoder 14, and is temporarily stored in a buffer memory 15. Afterwards, the data compression is processed in a data compressor 16 according to the standard specified for facsimile communications, and is coded. The coded image data is transmitted to a telephone line 18 by a transmission circuit 17 comprising a newwork control unit (NCU) and others. The transmitting means is composed of decoder 14, buffer memory 15, data compressor 16, and transmission circuit 17.

FIG. 3 is a drawing showing the structure of the transmission information storing memory C. The transmission information storing memory C comprises plural store area (hereinafter the store area are called clusters) C1 to Cn. The image data from the data compressor 13 is divided and stored in the clusters C1 to Cn.

Figure 4:
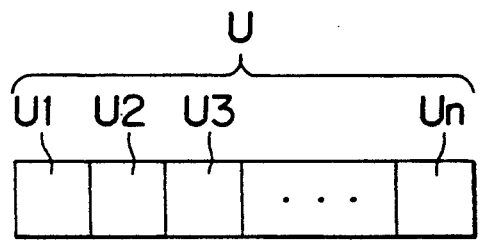
FIG. 4 is a drawing showing the structure of a cluster control memory U.

FIG. 4 is a drawing showing the structure of the cluster control memory U. The cluster control memory U is composed of store areas U1 to Un corresponding individually to the clusters C1 to Cn in the transmission information storing memory C. In each one of the store areas U1 to Un, the data showing whether the image data is to be transmitted to the corresponding clusters C1 to Cn is stored or not is stored.

In other words, a store area Ui (i=1, 2, ..., n) is composed of, for example, one bit, and if the image data to be transmitted is stored in cluster Ci, in store area Ui, a "1" is stored, and if no image data to be transmitted is not stored, or when the image data from the data compressor 13 can be stored in this cluster Ci, a "0" is stored.

Figure 5:
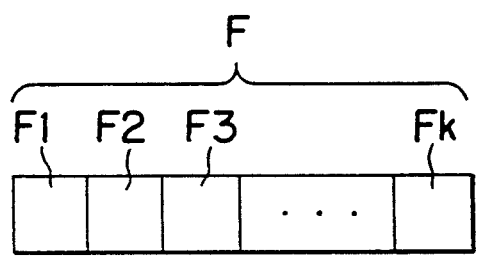
FIG. 5 is a drawing showing the structure of a start cluster storing memory F.

FIG. 5 is drawing showing the structure of the start cluster storing memory F. The start cluster storing memory F is composed of plural store areas F1 to Fk. Each one of the store area F1 to Fk individually correspond to each destination when transmitting the image data to plural destinations. In a store area Fm (m=1, 2, ..., k), the cluster number j0 of the cluster Cj0 (j0=1, 2, ..., n) in which the first image data to be transmitted to the corresponding destination is stored.

Figure 6:
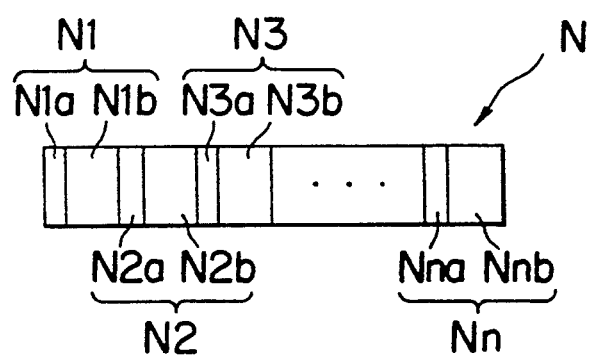
FIG. 6 is a drawing showing the structure of a transmission sequence storing memory N.

FIG. 6 is a drawing showing the structure of the transmission sequence storing memory N. The transmission sequence storing memory N is composed of store area N1 to Nn individually corresponding to the cluster C1 to Cn of the transmission information storing memory C. A store area Ni (i=1, 2, ..., n) is composed of two area Nia and Nib.

In the store area Nia, for example, "1" is stored if the final image data to be transmitted to the destination is stored in the cluster Ci corresponding to the store area Ni. If the final image data to be transmitted to the destination is not stored in the cluster Ci, for example, "0" is stored.

In the store area Nib is stored the cluster number of the cluster in which the image data to be sequentially transmitted to the image data of the cluster Ci is stored.

Figure 7:
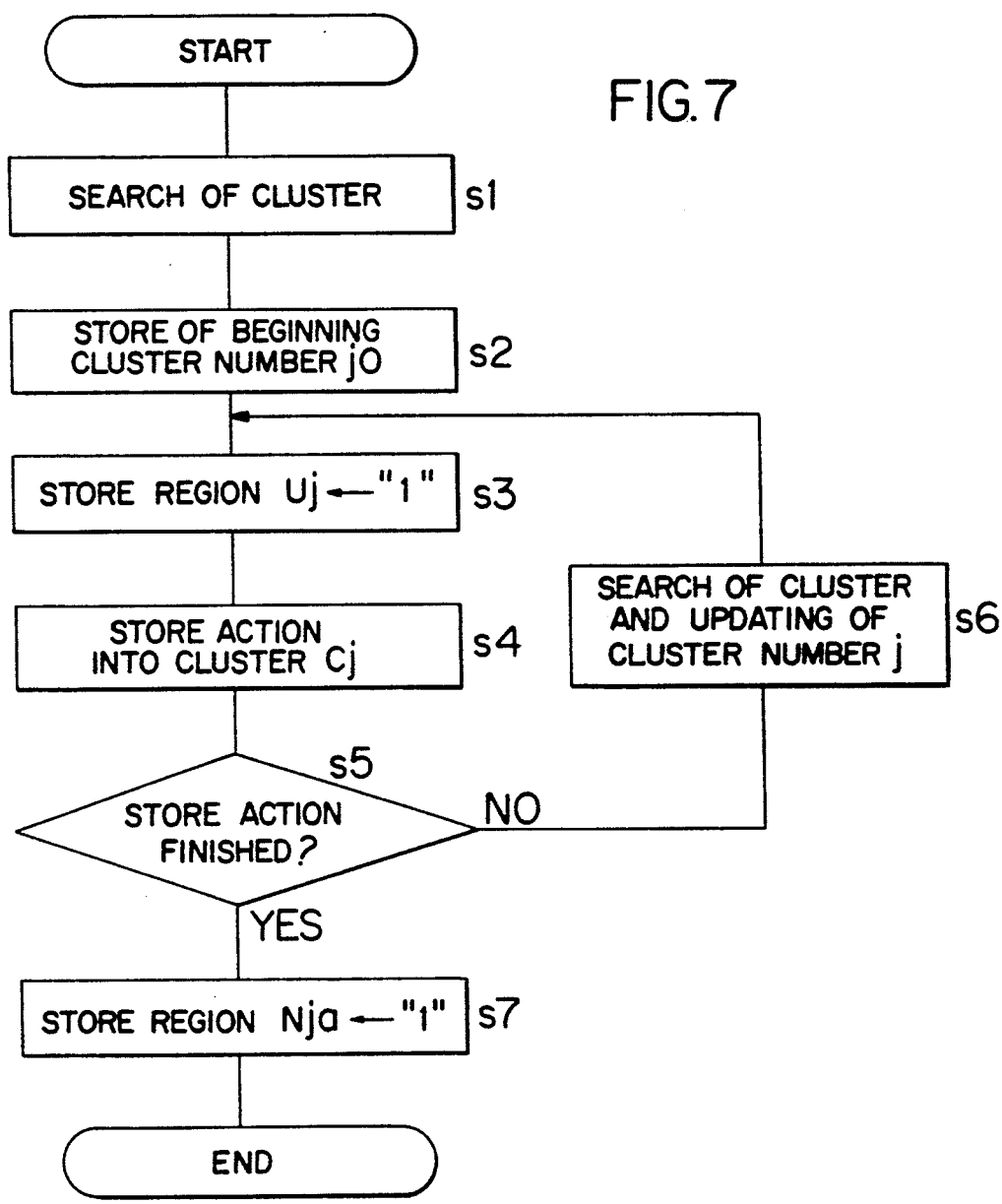
FIG. 7 is a flow chart for explaining the image data writing action into the transmission information storing memory C.

FIG. 7 is flow chart explaining the writing action into the transmission information storing memory C in such facsimile apparatus 11. Referring to FIG. 7, the image data from the data compressor 13, is divided into predetermined data lengths, and is inputted to the transmission information storing memory C. At this time, a step s1, a cluster available for storing the image data is searched. That is, in the cluster control memory U, the store area Uj where "0" is stored is searched. Afterwards, at step s2, the cluster number j corresponding to the store area Uj is stored in, for example, the store area Fk of the start cluster storing memory F as the beginning cluster number j0.

At step s3, the data stored in the store area Uj of the cluster control memory U is updated to "1". Next, at step s4, the image data for the portion of one cluster from the data compressor 13 is stored in the cluster Cj.

At step s5, it is judged whether the storing process of the image data to be transmitted to one destination is finished or not. If not, go to step s6, after "0" is stored in the store area Nja corresponding to the cluster number j of the transmission sequence storing memory N, in the cluster control memory U again, the store area Uj1 in which "0" is stored is searched. As a result, the cluster number j is updated to the cluster number j1 corresponding, for example, to the store area Uj1 being searched, and is stored in the store area Njb of the transmission sequence storing memory N. Then, returning to step s3, the same process is effected to the new cluster number j.

At step s5, if the storing process of the image data to one destination is over, advancing to step s7, "1" is stored in the store area Nja of the transmission sequence storing memory N corresponding to the cluster number j at the time of end of storing process. In this way, the store action of image data to one destination is over.

Such storing process is repeated several times when transmitting different original images to plural destinations. Finally, the image data to each destination is stored in the transmission information storing memory C.

Figure 8:
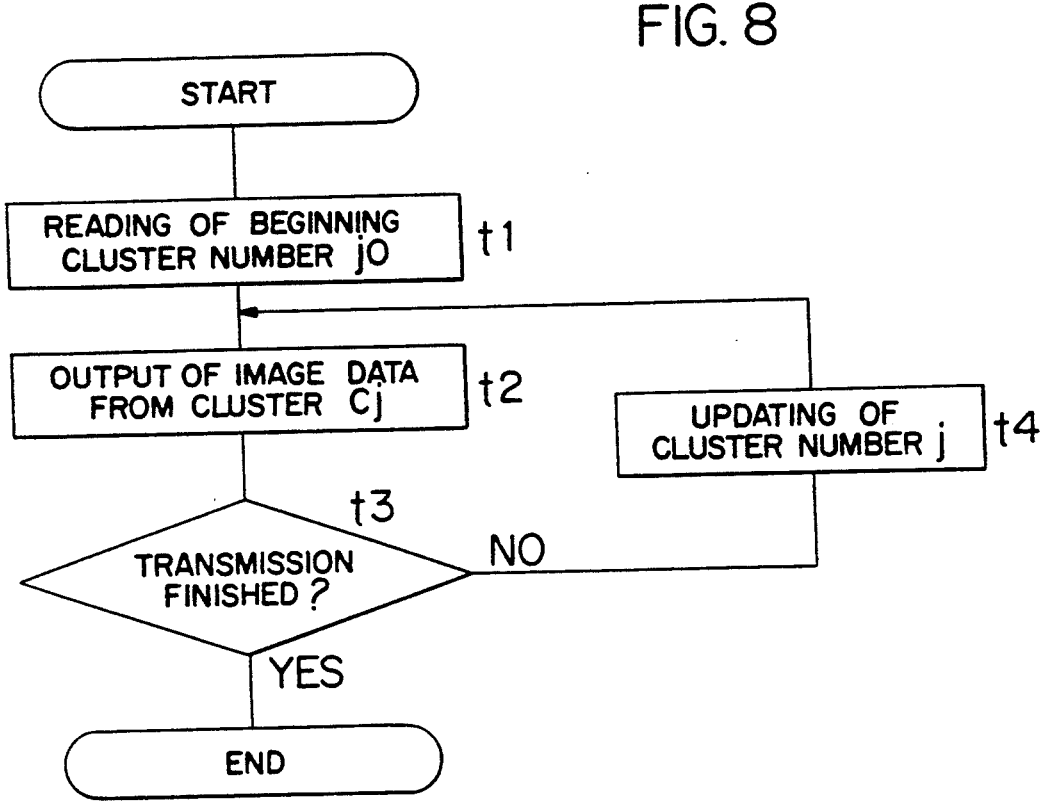
FIG. 8 is a flow chart for explaining the reading action from the transmission information storing memory C.

FIG. 8 is a flow chart for explaining the action for transmitting the image data stored in the above-mentioned action. At step t1, by the above action, the beginning cluster number j0 stored, for example, in the store area Fk of the start cluster storing memory F is read as the cluster number j. Then, at step t2, the image data from the cluster Cj of the cluster number j is delivered a decoder 14, and the above transmission process is effected. At step t3, it is judged whether the transmission of the image data to the destination is finished or not. That is, if the data stored in the store area Nja of the transmission sequence storing memory N is "0", it is judged that there is image data to be transmitted in succession, and the operation goes to step t4.

At step t4, the cluster number stored in the store area Njb is referred to, and the cluster number j is updated to this referred cluster number. Then returning to step t2, the process is effected to the new cluster number j.

At step t3, if it is judged that the transmission of image data to one destination is finished, in this facsimile apparatus 11, the reading process of the image data from the transmission information storing memory C to the destination is finished. In other words, if the data stored in the store area Nja is "1", the transmission process of the image data to that destination is finished.

After the image data to one destination is read from the transmission information storing memory C, that image data must be erased from the transmission information storing memory C.

Figure 9:
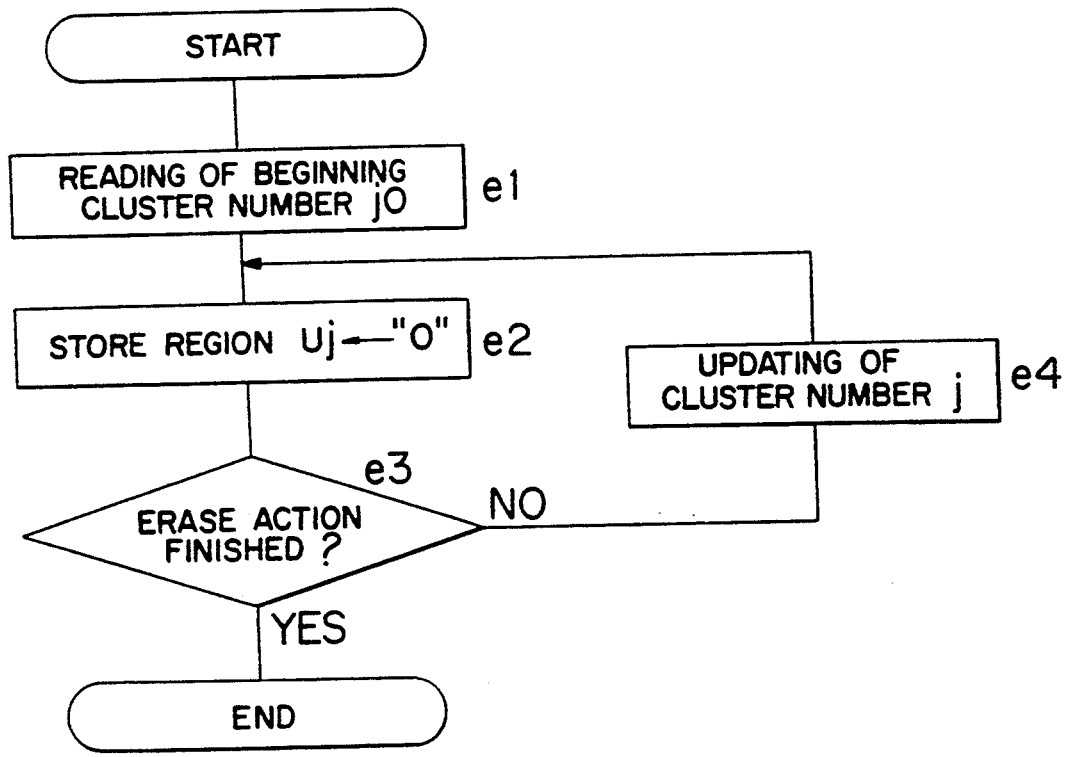
FIG. 9 is a flow chart for explaining the image data erasing action of the transmission information storing memory C.

FIG. 9 is a flow chart explaining such an erasing process.

Referring to FIG. 9, the beginning cluster number j0 of the image data read out from the transmission information storing memory C for transmitting to one destination is stored in the store area Fk corresponding to the destination of the start cluster storing memory F. Therefore, at step e1, after transmission of image data, the cluster number j0 of the store area Fk is read as the cluster number j of the cluster for storing the image data to be erased. Next, at step e2, data "0" is written in the store area Uj in the cluster control memory U.

At step e3, it is judged whether the final cluster is erased or not. That is, when "0" is stored in the store area Nja, it is judged that the final cluster is not erased, and the operation advances to step e4. At step e4, the cluster number stored in the store area Njb is read. As a result, the cluster number j is updated by the cluster number being read. Then returning to step e2, the same process is repeated on the new cluster number j.

At step e3, if the data stored in the store area Nja is "1", it is judged that the final cluster is erased, and the erase process of the image data in the transmission information storing memory C is terminated. Thereafter, transmission process, for example, to other destination is started.

Thus, in this embodiment, reading and transmitting the image data from the transmission information storing memory C are executed according to the sequence stored in the transmission sequence storing memory N in which the transmission sequence is preliminarily stored. When erasing the image data being transmitted, it is enough only to change the data in the store area corresponding to the cluster to be erased in the cluster control memory U. Therefore, it is not necessary to shift a huge quantity of image data stored in the transmission information storing memory C, and the transmission time may be notably shortened.

This embodiment relates to an example of realizing the transmitting apparatus of the stored information of memory in relation to the facsimile apparatus, but the invention may be also executed in transmission of the stored information of hard disk, floppy disk or randam-access memories (RAM) in relation to apparatus such as personal computer as far as the apparatus is intended to store the information to be transmitted in the memory. Meanwhile, in the foregoing embodiment, the transmission sequence storing memory N and the cluster control memory U are separately disposed, but it may be also possible to store the data showing whether or not the image data to be transmitted is stored in the cluster Cj, that is, the data of the store area Uj, in each store area Nj of the transmission sequence storing memory N.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and the range of equivalency of the claims are therefore intended to be embraced therein.

What is claimed is:

1. A method for transmitting image data stored in a memory of a facsimile apparatus comprising the steps of:
    (a) producing image data;
    (b) storing, in a first memory, the image data, the first memory being divided into individual storage areas such that a single message of image data is stored in a single individual storage area, each individual storage area having a distinct label;
    (c) storing, in a second memory, a start address for each individual storage area of the first memory;
    (d) storing, in a third memory having a plurality of locations, the distinct labels of each individual storage area, the distinct labels being stored in the third memory according to a transmission sequence order such that the label corresponding to the single message of image data that is to be transmitted first is stored in a first location of the third memory;
    (e) storing, in a fourth memory having a plurality of individual compartments wherein each compartment corresponds to an individual storage area, data in separate compartments, the data indicating if the individual storage area corresponding to that compartment in the fourth memory has image data stored therein or no image data stored therein;
    (f) coding a single message of stored image data;
    (g) transmitting the coded message of image data; and
    (h) updating the fourth memory such that the compartment corresponding to the individual storage area of the transmitted single message of image data indicates that the individual storage area is available for storing a new message therein.

2. A facsimile apparatus comprising:
    image means for producing image data;
    a first memory for storing the image data, said first memory being divided into individual storage areas such that a single message of image data is stored in a single individual storage area, each individual storage area having a distinct label;
    a second memory for storing a start address for each individual storage area of said first memory, said second memory having individual locations corresponding to the individual storage areas such that one location will, for all operations, have the start address for a same individual storage area;
    a third memory for storing the distinct labels of each individual storage area, the distinct labels being stored in said third memory according to a transmission sequence order such that the label corresponding to the individual storage area having the single message of image data to be transmitted first is stored in a first location of said third memory;
    a fourth memory, having a plurality of individual compartments, each compartment corresponding to an individual storage area, for storing data indicating if the individual storage area corresponding to that compartment in said fourth memory has image data stored therein or no image data stored therein;
    coding means for coding a single message of image data;
    transmitting means for transmitting the single message of coded image data; and
    control means, operatively connected to said image means, first memory, second memory, third memory, fourth memory, coding means, and transmitting means, for updating data in a location of said fourth memory corresponding to the individual storage area having the transmitted single message of coded image data to indicate that the individual storage area is available for storing a new message of image data therein.

3. The apparatus as claimed in claim 2, wherein said image means comprises image pickup elements.

4. The apparatus as claimed in claim 2, wherein said transmitting means transmits the single message of coded image data through telephone lines.

5. The apparatus as claimed in claim 2, wherein said second memory stores a last address of the single message of image data and information corresponding to a destination code to which the single message of image data is to be transmitted.

6. A facsimile apparatus comprising:
    image means for producing image data;
    first memory means for storing the image data, said first memory means being divided into individual storage areas such that a single message of image data is stored in a single individual storage area, each individual storage area having a distinct label;
    second memory means for storing a start address for each individual storage area of said first memory means, said second memory means having individual locations corresponding to the individual storage areas such that one location will, for all operations, have the start address for a same individual storage area;
    third memory means for storing the distinct labels of each individual storage area, the distinct labels being stored in said third memory means according to a transmission sequence order such that the label corresponding to the individual storage area having the single message of image data to be transmitted first is stored in a first memory location of said third memory means;

fourth memory means, having a plurality of individual compartments, each compartment corresponding to an individual storage area, for storing data indicating if the individual storage area corresponding to that compartment in said fourth memory means has image data stored therein or no image data stored therein;

coding means for coding a single message of image data;

transmitting means for transmitting the single message of coded image data; and control means, operatively connected to said image means, first memory means, second memory means, third memory means, fourth memory means, coding means, and transmitting means, for updating data in a location of said fourth memory means corresponding to the individual storage area having the transmitted single message of coded image data to indicate that the individual storage area is available for storing a new message of image data therein.

7. The apparatus as claimed in claim 6, wherein said image means comprises image pickup elements.

8. The apparatus as claimed in claim 6, wherein said transmitting means transmits the single message of coded image data through telephone lines.

9. The apparatus as claimed in claim 6, wherein said second memory means stores a last address of the single message of image data and information corresponding to a destination code to which the single message of image data is to be transmitted.

* * * * *